3,591,357
METHOD FOR TREATING AND IMPREGNATING GLASS FIBER BUNDLES FOR REINFORCEMENT OF ELASTOMERIC MATERIALS
Nicholas S. Janetos, East Providence, and Alfred Marzocchi and David E. Leary, Cumberland, R.I., assignors to Owens-Corning Fiberglas Corporation
Continuation-in-part of abandoned application Ser. No. 655,944, July 25, 1967. This application Aug. 13, 1969, Ser. No. 849,676
The portion of the term of the patent subsequent to Jan. 28, 1986, has been disclaimed
Int. Cl. C03c 25/02; B32b 17/04
U.S. Cl. 65—3
22 Claims

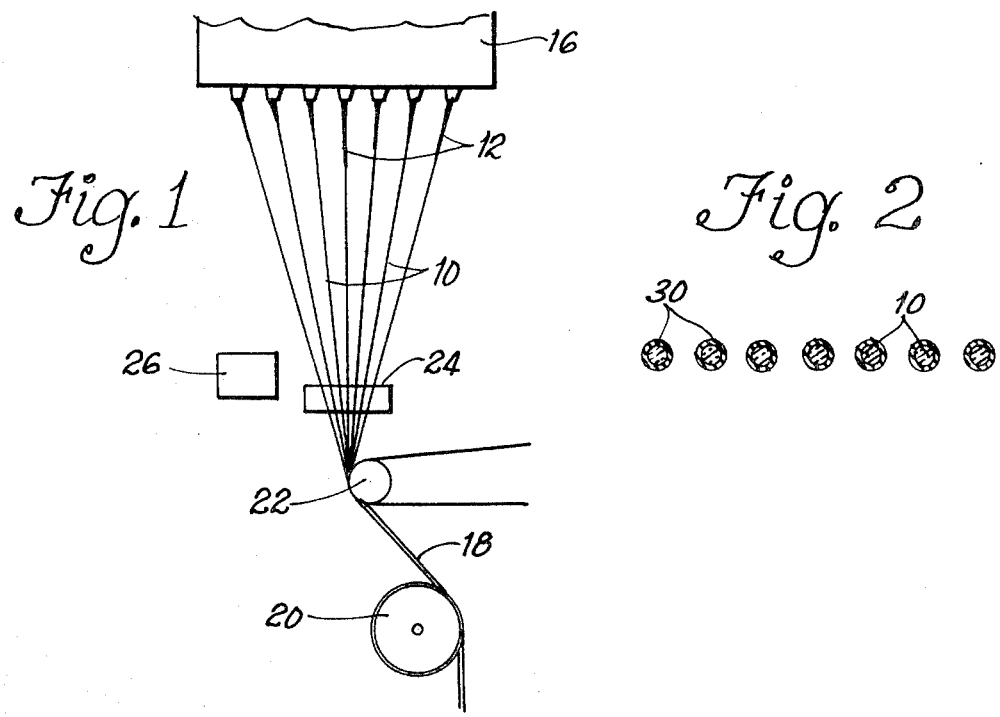
Fig. 1
Fig. 2
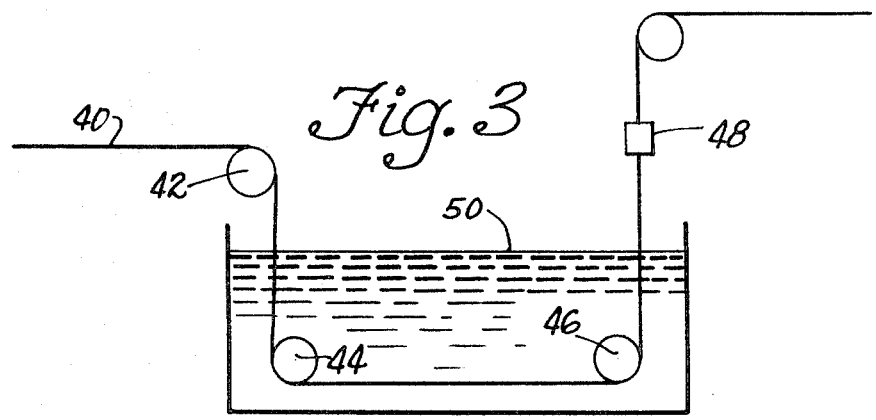
Fig. 3
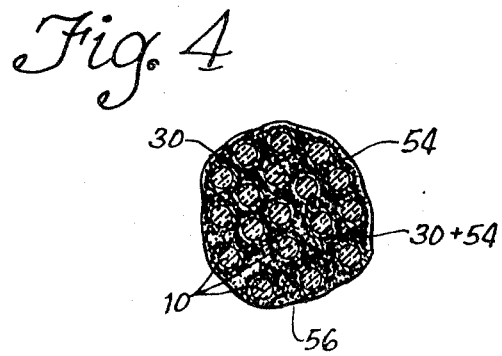
Fig. 4
INVENTORS
Nicholas S. Janetos
Alfred Marzocchi
David E. Leary
by Staelin and Overman Attys United States Patent Office 3,591,357
Patented July 6, 1971

ABSTRACT OF THE DISCLOSURE

This invention resides in the preparation of bundles, i.e. strands, yarns, cords and fabrics, formed of a plurality of reinforcing glass fibers in which the glass fiber bundle embodies an amount of elastomeric compatible treating material sufficient to permit repeated flexing without the fibers being able to cut through the coating protecting the fibers from destruction by mutual abrasion and sufficient to enhance the interbonded relationship between the treated bundles of reinforcing glass fibers and a continuous phase elastomeric material with which the glass fibers are combined in the manufacture of a glass fiber reinforced elastomeric product, such as glass fiber reinforced rubber tires, rubber belts and the like. The concepts of this invention reside in the coating of the individual glass fibers in connection with the glass fiber forming operation to provide a coating on the individual glass fibers sufficient to protect the fibers from destruction during flexure of the bundles that is subsequently formed of the coated glass fibers but insufficient to prevent processing the glass fibers and the bundles formed thereof into strands, yarns, cords or fabrics, then impregnating the bundle subsequently formed to complement the coating and incorporate the total impregnant adequate for the utilization of the glass fiber bundle as a reinforcement in elastomeric products.

This is a continuation-in-part of our copending application Ser. No. 655,944, filed July 25, 1967, entitled "Method for Treating and Impregnating Glass Fiber Bundles for Reinforcement of Elastomeric Materials" and now abandoned.

This invention relates to the treatment of glass fibers for use of the glass fibers in combination with elastomeric materials in the manufacture of glass fiber reinforced elastomeric products, such as rubber belts, rubber tires and the like, formed of natural or synthetic rubbers where high strength, toughness and dimensional stability can be greatly benefitted by the presence of the glass fibers.

Considerable research and development have been conducted in utilization of glass fibers as a reinforcement for elastomeric materials in the manufacture of glass fiber reinforced products.

From the careful analysis of such research and development, conducted over the past several years, it has been concluded that best use of glass fibers as a reinforcement for elastomeric materials is achieved when the glass fibers are embodied in the elastomeric materials in the form of bundles of a multiplicity of glass fibers wherein the bundle is capable of reacting as a unit with sufficient adjustment between the fibers to enable substantially all of the fibers in the bundle to contribute their fare share in resisting the forces to which the reinforced product is being subjected.

Having established the basic requirements for a suitable glass fiber reinforcement for elastomeric products, the problem arises with respect to the method and means for producing glass fiber reinforcing elements which meet these basic requirements for their utilization as a glass fiber reinforcement in glass fiber reinforced elastomeric products.

It is an object of this invention to produce and to provide a method for producing reinforcing bundles of glass fibers in which the bundles of glass fibers embody an elastomeric compatible material which provides a protecting coating on the individual glass fibers in the bundle and yet prevents interfilament bonding, which enables the fibers and the bundles formed thereof to be flexed in processing to the desired arrangement for reinforcement without permitting the individual glass fibers in the bundle to cut through the protective coating, yet permits the glass fibers to be processed to the desired form for reinforcement, and which embodies a full complement of elastomeric compatible material sufficient to achieve a strong and permanent interbonded relationship between the reinforcing bundle of glass fibers and the continuous phase elastomer in the glass fiber reinforced elastomeric product.

These and other objects and advantages of the invention will hereinafter appear and for purposes of illustration, but not of limitation, an embodiment of the invention is shown in the accompanying drawing in which:

FIG. 1 is a schematic elevational view of one phase of the process for coating the glass fibers in forming;

FIG. 2 is a partial sectional view of the bundle of glass fibers produced by the phase of the operation shown in FIG. 1;

FIG. 3 is a schematic view of a further phase of the operation for the treatment of the glass fibers in accordance with the practice of this invention; and FIG. 4 is a sectional view of a portion of a glass fiber bundle which results from the process illustrated in FIGS. 1-3.

This invention is addressed to one technique for the production of reinforcing bundles of glass fibers having the desired characteristics for optimizing use as a reinforcement in the manufacture of glass fiber reinforced elastomeric products. It has been found that the desired characteristics in a glass fiber bundle for reinforcement of elastomeric materials in the manufacture of glass fiber reinforced elastomeric products can be achieved when the individual glass fibers, making up the glass fiber bundle, are provided with a protective coating of elastomeric based material and when the bundle of reinforcing glass fibers is loaded with a full complement of elastomeric based material which, in the practice of this invention, amounts to a glass fiber bundle containing more than 10% by weight and preferably more than 13% by weight of elastomeric based material when calculated on a dry solids basis and in which the elastomeric based material is distributed throughout the bundle of glass fibers in the manner hereinafter described.

Optimum loading is nearly incapable of practical achievement by the conventional processes of single or multiple impregnations of the glass fiber bundle because of the difficulty experienced in getting the elastomeric based impregnating composition to penetrate uniformly completely through the glass fiber bundle. As a result, the individual glass fibers in the interior portions of the bundle tend to have less protective coating of elastomeric material. Further, the initial impregnation sufficiently clogs the interstices between the glass fibers making up the bundle to inhibit further penetration into the interior of the glass fiber bundle during subsequent impregnations necessary to achieve the more than 10-13% by weight loading, with the result that the desired degree of interbonding between the impregnated bundle of glass fibers and the continuous phase elastomeric material is not achieved during the subsequent cure to form the glass fiber reinforced elastomeric products. Still further, in the absence of elastomeric material in the interior portions of the glass fiber bundles, the glass fibers forming a major part of the bundle are unable to enter with the other fibers of the bundle into the reinforcement of the elastomeric system.

In the alternative, attempts have been made to achieve the higher loading with uniform distribution of elastomeric based material to coat the glass fiber filaments throughout the cross section of the glass fiber bundle by application of the elastomeric based treating composition in a manner to coat the individual glass fibers during their forming operation, but before the multiplicity of glass fibers are gathered together to form the strand or bundle of glass fibers. However, when the full complement of elastomeric based materials are applied to coat the individual glass fibers during their forming operation, it becomes difficult and practically impossible subsequently to process the bundle of glass fibers to the form desired for use as a reinforcement, such as by plying, twisting, intertwisting, drafting, weaving and the like to form the reinforced bundle of glass fibers, i.e. strands, yarns, cords of fabrics. This is because of the tendency of the fibers within a bundle of treated glass fibers to seize one another to prevent processing unless the treated bundle of glass fibers has been subjected to intermediate processing steps, such as drying, curing, or the like, or treated to coat the bundle of glass fibers with a lubricant to reduce the tendency towards seizure.

It has been found, in accordance with the practice of this invention, that up to 10% by weight of an elastomeric treating composition, calculated on the dry solids basis, can be applied to the glass fiber filaments in forming to coat the individual glass fiber filaments, without interfering with the ability to process the coated glass fibers into strands, yarns, cords or fabrics, and that the remainder of the elastomeric based material desired completely to load the formed bundle of glass fibers with elastomeric based materials can be subsequently incorporated by one or more impregnations of the bundle of coated glass fibers after it has been processed to the form desired for use as a reinforcement. In the practice of this invention, elastomeric based material in an amount within the range of 4–10% by weight solids is applied as a coating to the glass fibers in forming while the remainder to make up the full complement of elastomeric based materials in an amount within the range of 10–24 percent is applied by subsequent impregnation of the formed bundles of coated glass fibers.

When less than 4% by weight of solids of elastomeric based material is applied as a coating onto the individual glass fibers during the forming operation, the amount of elastomeric based material is insufficient to prevent the fibers from breaking through the coating upon flexure during subsequent processing steps, unless the elastomeric material applied as the coating has been set, as by complete or partial cure. Such complete or partial cure at this stage of the operation is deemed to be undesirable in the concepts of this invention, since such complete or partially cured elastomeric material inhibits subsequent impregnation of the formed glass fiber bundle as desired for full loading of the reinforcing bundle of glass fibers and as desired for distribution of the elastomeric based material throughout the glass fiber bundle.

When more than 10% by weight solids is applied in forming, other difficulties are experienced during subsequent processing of the bundle of the glass fibers to the form desired for reinforcement and still further difficulties are experienced by loss of treating composition as the bundle of glass fibers is whipped or flexed during subsequent processing to form strands, yarns, cords or fabrics. Thus the amount of elastomeric based material applied as a coating onto the individual glass fiber filaments in forming is within the range of about 4–10% by weight, calculated on the dry solids basis, with best results being secured within the range of 7–8% by weight.

The resulting bundle of glass fibers coated in forming with the elastomeric based material is capable of being penetrated by elastomeric based impregnating compositions such that the elastomeric based material subsequently incorporated into the glass fiber bundle as an impregnant is capable of entering into the bundle of treated glass fibers for better integration between the elastomeric impregnant and the coated glass fibers making up the bundle. However, because of the inability of the impregnating composition completely to penetrate the bundle of glass fibers, the distribution of elastomeric based material throughout the impregnated glass fiber bundle will range from a lesser concentration of elastomeric material in the central regions of the bundle and with increasing concentrations of elastomeric material towards the outside of the bundle, with perhaps an encasing layer of elastomeric material about the impregnated bundle of glass fibers, especially when multiple impregnations are employed.

The amount of elastomeric material incorporated by way of impregnation should be sufficient, when added to the amount incorporated by coating the glass fibers in forming, to exceed 10% by weight of the treated glass fiber bundle, when calculated on a solids basis. When the glass fiber bundle is loaded with a total of less than 10% by weight elastomeric material, interbonding between the bundle of reinforcing glass fibers and the continuous phase elastomeric material is not maximized, such that full advantage is not derived from the glass fiber reinforcement.

It has been found that by the described process of coating the glass fibers in forming to embody 4–10% by weight loading of elastomeric based material, followed by impregnation of the bundle of coated glass fibers, it becomes possible, for the first time, to effect loading in amounts up to 24–25% by weight of elastomeric based materials. Loading in amounts in excess of 24–25% by weight, calculated on the solids basis, is deemed to be undesirable since it becomes difficult to retain the impregnant on the reinforcing bundle of glass fibers and, when present in such amounts, the reinforcing bundle of glass fibers ends up with an outer rubber phase which is free of reinforcing glass fibers so that the limitation again reverts to the characteristics of the pure rubber.

Thus it becomes possible, in the preferred practice of this invention, to achieve full loading of the reinforcing bundle of glass fibers with an amount of elastomeric based material within the range of 10–25% and preferable within the range of 13–18% by weight. Vastly improved flexure endurance is experienced with a total of 18–20% by weight of elastomeric material in the coating and impregnated reinforcing bundle of fibers.

While the resulting product will still have a high concentration of the elastomeric material in the outer portions of the bundle of glass fibers, sufficient elastomeric material will be uniformly distributed throughout the cross-section of the glass fiber bundle to maximize the utilization of the glass fiber component as a reinforcement for the continuous phase elastomer of which the elastomeric product is formed. Impregnation of the formed bundle of coated fibers can be achieved by the usual dip coating technique or by flow coating, with one or more dips, preferably with intermediate drying.

The resulting bundle can be incorporated with the continuous phase elastomer in the usual manner for glass fiber reinforcement, such as winding about the layers of rubber in belt construction, as described in copending application Ser. No. 247,244, filed Dec. 26, 1962, now Pat. 3,296,050 or by laying down cords as radial or bias cords in tire formation, as described in copending application Ser. No. 453,938, filed May 7, 1965, now Pat. 3,334,166, As used herein, the elastomeric compatible material refers to either an elastomeric or resinous based material, and the term "elastomeric based material" is meant to refer to a glass fiber coating composition or a glass fiber bundle impregnating composition in which an elastomeric material constitutes the sole solids component of the coating or impregnating composition or preferably constitutes merely a component of the coating or impregnating composition in combination with other materials such as a resin, as represented by epoxy resin, polyester resin, styrene-butadiene, phenol formaldehyde resin, resorcinol formaldehyde resin and the like, or a filler such as zinc oxide, carbon black and the like, and/or a lubricant such as graphite, wax or the like, or the combination of elastomers alone or in combination with the resinous material as represented by the compositions described in the copending application Ser. No. 398,305, filed Sept. 22, 1964; Ser. No. 400,517, filed Sept. 30, 1964 now abandoned; Ser. No. 397,916, filed Sept. 21, 1964 now Pat. 3,233,269, and Ser. No. 949,654, filed Oct. 11, 1965, now abandoned.

It will be understood that the elastomeric system in the elastomeric coating composition may be the same or different than the elastomeric system in the impregnating composition.

As used herein, the term "continuous phase elastomer" is meant to refer to the rubber or elastomeric phase forming the above or the continuous phase of the elastomeric product. The elastomeric phase of the coating composition and/or the impregnating composition may be the same or different than the elastomeric material forming the continuous phase but it is desirable that such elastomeric materials be compatible one with the other, at least in their uncured state, so as to avoid phase operation.

As the elastomeric material of the continuous phase end of the impregnating or coating compositions, use can be made of natural rubber or a synthetic rubber, such as formed by polymerization of monomeric materials such as chloroprene, various of the conjugated butadienes, such as 1,3-butadiene, methyl-2-butadiene, 1,3-piperylene, and 2,3-dimethyl butadiene; and mixtures of such conjugated butadienes with other copolymerizable monomers, such as up to 50% or more by weight of a monomer which contains a monoolefinic group, such as aryl olefins as represented by styrene and vinyl naphthalene; and alpha-methylene carboxylic acids and their corresponding esters, nitriles and amides, such as acrylic acid, methyl acrylates, methyl methacrylate, acrylonitrile, methyl acrylamide and the like; isobutylene, methyl-vinyl-ether and methyl-vinyl-ketone. The elastomeric component may also comprise an EPDM type rubber such as formed by the interpolymerization of ethylene, a monoolefin containing from 3 to 18 carbon atoms, such as propylene, butylene, etc., and a polyolefin, such as cyclopentadiene, 1,2-hexadiene, and preferably a 5-alkylene-2-norbornene or a 5-alkylidene-2-norbornene, such as 5-ethylidene-2-norbornene, 5-propylidene-2-norbornene, 5-butenyl-2-norbornen and the like.

As used, herein, the term coating the glass fiber filaments "during forming" is meant to refer to a coating of the individual glass fibers as they are drawn by rapid attenuation of molten streams of glass issuing from openings through the wall of a bushing or feeder communicating with a glass melting chamber. The attenuated glass fibers are gathered together to form a strand which is suitably collected, as by being found upon a rapidly rotating drum or spindle. Some hundreds of such glass fiber filaments are gathered together to form the strand which can be later plied, twisted or intertwisted with other strands to form yarns or cords, which can be processed by weaving or the like into desired reinforcing fabrics. Application of the elastomeric based coating composition is made in the conventional manner by a pad or roller continuously wet with the composition and over which the filaments are drawn as they are gathered together to form the bundle. This describes the forming operation for continuous fibers. With discontinuous fibers, formed by engaging the molten streams of glass with downwardly directed blasts of high pressure air, steam or gas, treating composition may be sprayed onto the discontinuous fibers as they rain down onto a collecting surface, either gravitationally or with the aid of the blast. Instead, the treating composition can be applied after the discontinuous fibers have been collected on the surface but before removal for drafting to form the yarn.

Specific description will now be made of the practice of this invention with the following glass fiber treating and impregnating compositions set forth by way of examples:

Impregnating compositions as described in application Ser. No. 398,305:

EXAMPLE 1

| | Percent by weight |
|---|---|
| Natural rubber latex-resorcinol formaldehyde resin dispersed in aqueous medium to 38% solids (Lotol 5440—U.S. Rubber Company) | 60 |
| Water | 40 |

EXAMPLE 2

| | Percent by weight |
|---|---|
| Natural rubber latex-resorcinol formaldehyde resin dispersed in aqueous medium to 38% solids | 15 |
| Water | 82 |
| Gamma-aminopropyltrithyoxysilane | 3 |

The dispersion and water mixture are made alkaline with quaternary ammonium hydroxide before addition of the silane.

Impregnating compositions as described in application Ser. No. 400,517:

EXAMPLE 3

| | Parts by weight |
|---|---|
| Resorcinol formaldehyde resin | 2.0 |
| Formaldehyde | 1.4 |
| Concentrated ammonium hydroxide | 5.0 |
| Vinyl pyridine-butadiene-styrene terpolymer in the ratio of 15:70:15–47% solids (Gen-Tac FS—General Tire & Rubber Co.) | 25.0 |
| Neoprene rubber latex (50% solids) | 50.0 |
| Butadiene-latex (60% solids) | 7.4 |
| Sodium hydroxide | 0.2 |
| Water | 58.0 |

EXAMPLE 4

| | Parts by weight |
|---|---|
| Resorcinol formaldehyde resin | 2.0 |
| Formaldehyde (37% solution) | 1.0 |
| Concentrated ammonium hydroxide | 2.7 |
| Vinyl pyridine-butadiene-styrene terpolymer latex (42% solids) | 25.0 |
| Neoprene ruber latex (50% solids) | 41.0 |
| Butadiene latex (60% solids) | 5.0 |
| Sodium hydroxide | .05 |
| Gamma-aminopropyltriethory-silane | 1.0 |
| Water | 1100 |

Impregnating compositions as described in application Ser. No. 494,654, filed Oct. 11, 1965:

EXAMPLE 5

| | Parts by weight |
|---|---|
| Water | 220 |
| Sodium hydroxide | 1 |
| Resorcinol formaldehyde resin (70% solids) | 22 |
| Formalin | 15 |
| Ammonium hydroxide | 30 |
| Vinyl pyridine-butadiene-styrene terpolymer latex (15:70:15) (41% solids) | 250 |
| Neoprene rubber latex (50% solids) | 415 |
| Butadiene rubber latex (60% solids) | 51 |
| Carbon black | 115 |

Continuous glass fiber filaments 10 are formed by the rapid attenuation of molten streams of glass 12 issuing form openings through the bottom side of a glass melting bushing 16. The molten streams are rapidly attenuated into fibers and gathered together in a bundle or strand 18 by being brought together over a guide 22, with the strand being wound about or advanced by a rapidly rotating drum 20.

Application of the coating composition of Examples 1–5 or other rubber based impregnating composition is made preferably to the individual glass fiber filaments 10 before they are gathered together, as by means of a roller coaster 24 so that the individual fibers or filaments will each be separately coated with a layer of the coating composition.

The peripheral surfaces of the roller are continuously wet by an application blade or an applicator brush fed from a reservoir 26 in a conventional way and the individual filaments ride over the periphery of the roller 24 subsequent to their attenuation but before they are gathered together to form the bundle. After being coated by the roller, use can be made of a guide pad 22 to gather the fibers together to form the bundle in which the individual fibers 10 are wet with the treating composition. More than one applicator roller may be employed for wetting the individual glass fibers, depending somewhat upon the solids content of the coating composition and the amount that is picked up by the fibers. In some cases part of the coating composition may be applied by supplying coating composition to the guide pad 22. However performed, application of coating composition to the individual glass fibers should provide a coating 30 having a weight baesd upon dry solids of more than 4% but less than 10% and preferably about 6–8% by weight of the glass fibers.

The strands of glass fibers 18, when dried, can be combined with other strands, or plied, twisted or otherwise joined with other strands to form threads, yarns or cords which can be further processed by weaving to form woven or non-woven fabrics, or can be chopped or cut to short lengths, say 2 to 3 inches, all of which are included herein within the term "glass fiber bundle" to define the product which is subjected to the subsequent impregnating operation to incorporate the additional amounts of rubber based material adapted at least partially to penetrate into the treated glass fiber bundle and to build up the higher concentration of rubber in the outer portions of the glass fiber bundle by comparison with the interior of coated bundle glass fibers.

After processing the coated glass fibers to the desired bundle form for combination with the continuous phase elastomer in the manufacture of glass fiber reinforced elastomeric products, the bundles of glass fibers are immersed or otherwise wet with one of the aforementioned rubber based treated compositions of Examples 1–5 or other rubber based impregnating material.

For a schematic illustration, but not by way of limitation, a cord 40 of coated glass fibers in bundle form is advanced continuously over roller 42 downwardly under rollers 44 and 46 and upwardly through a die 48 for complete immersion in the bath 50 of the treating composition. During passage through the bath, the bundle of coated glass fibers will be impregnated with the treating composition to increase the amount of rubber based solids embodied within the glass fiber bundle.

Some of the impregnating composition will penetrate towards the interior of the bundle, brought about by the controlled amount of impregnant applied to the fibers during the forming operation, but most will be retained in the outer portions of the bundle whereby the concentration of impregnating solids will be greater in the outer portions of the bundle than in the interior of the bundle. The bundle may be passed through the bath one or more times, preferably with intermediate drying, until the total amount of rubber based treating composition, calculated on the solids basis, will be greater than 10% and preferably within the range of 13–20% and more preferably 16–18% by weight of the glass fibers.

As the impregnated bundle of glass passes through the die 48, the impregnating composition will be worked into the interior of the bundle and excess composition will be wiped from the outside of the bundle. Other auxiliary means may be employed to maximize the amount of impregnation, such as flexure of the bundle during impregnation or by the use of alternating pressure impulses and the like for working the material into the bundle. Instead, the bundle of glass fibers, in the form of a fabric, can be impregnated by running the fabric through a bath of impregnating composition while passing the fabric about idler rolls immersed in the bath or immediately over the bath to enhance penetration and remove excesses.

The impregnated bundle of glass fibers is dried by exposure to elevated temperature, such as from 250–500° F., for a short period of time to remove the volatiles and preferably for a period of time partially to advance the elastomeric material of the impregnating composition to a partially cured stage. Care should be taken to limit the time and temperature conditions to avoid full cure of the elastomeric material, otherwise proper integration with the continuous phase elastomer will be incapable of being achieved during the normal pressure molding or vulcanization steps to produce the elastomeric product.

The result of the impregnation is a glass fiber bundle having elastomeric based material distributed throughout the cross section of the glass fiber bundle with the individual glass fibers coated with elastomeric based material but in which the distribution ranges from a central portion formed almost primarily of the elastomeric coating material 30, an intermediate portion formed of a combination of elastomeric coating material 30 and elastomeric impregnating material 54 and an outer portion formed primarily of elastomeric impregnating material 54, with possibly a layer 55 of the latter encircling the bundle.

In effect, the original treatment of the fibers prior to impregnation of the glass fiber bundle produces a relatively porous bundle of glass fibers which permits penetration of the impregnating composition for anchorage, yet provides a coating on the indiivdual glass fibers from destruction by mutual abrasion and the like. The initial treatment also insures the presence of rubber based material throughout the cross section of the glass fiber bundle to cushion the fibers in the bundle and yet insure the tie-in between the glass fibers making up the bundle and the continuous phase elastomer for maximizing the contribution of the glass fibers as a reinforcement of the elastomeric product. It is believed that the bundle of glass fibers pretreated to contain the elastomeric based material throughout the cross section and the distribution of elastomeric based material with a lesser concentration in the central portion and a higher concentration at the outer portions, with the impregnant penetrating the treated glass fiber bundle, represents a new and improved product and the glass fiber reinforced elastomeric product embodying same is also believed to be new and novel.

It will be understood that the full complement of elastomeric material, that is more than 10% solids, can be applied to the glass fibers in forming if steps are taken either to prevent sudden turns or whipping of the coated fibers during strand, yarn or cord formation so as to militate against elastomeric material being thrown from the coated fibers and bundle formed thereof, and preferably if the coated glass fibers are subjected to a drying operation or partial cure before processing the glass fibers into strands, yarn, cords or fabrics.

With this construction, substantially complete utilizaton can be made of the glass fiber system in the elastomer of the continuous phase for maximizing the contribution of the high strength properties from the glass fibers without the need to rely upon the use of an anchoring agent to enhance the bond between the glass fiber surfaces and the elastomeric material. The presence of rubber based coatings and impregnating compositions about the glass fiber filaments making up the bundle and through the cross section of the bundle operates to integrate the glass fibers into the bundle and to integrate the bundle of glass fibers into the continuous phase elastomer whereby all of the fibers become involved in the reinforcing activity.

It will be apparent from the foregoing that we have provided a new and improved concept in the pretreatment of the glass fibers and in the bundles formed thereof whereby the glass fibers can be processed to the desired bundle form for use as a reinforcement while incorporating substantially greater amounts of rubber based impregnating composition to effect fuller utilization of the glass fiber reinforcement in the elastomeric product that is formed.

It will be understood that invention does not reside in the ultimate molding or vulcanization of the treated glass fiber system and the elastomeric material in the glass fiber reinforced elatomeric product but that such fabrication steps can be carried out with the treated glass fiber bundles in the conventional manner.

It will be understood that changes may be made in the details of formulation and application without departing from the spirit of the invention, especially as defined in the following claims.

We claim:

1. In the preparation of a reinforcement for glass fiber-elastomeric products in which the elastomeric material constitutes a continuous phase with the glass fibers arranged therein in bundles formed of a multiplicity of glass fibers, the steps of preparation of the glass fibers in the bundle form with an elastomeric based material loading of more than 10% by weight on the dry solids basis, comprising the steps of coating the individual glass fibers prior to bundle formation with an elastomeric based composition in a coating weight of up to 10% by weight on the dry solids basis, forming the multiplicity of coated glass fibers into glass fiber bundles, and then impregnating the processed bundle of glass fibers, prior to their combination with the continuous phase elastomer, with a rubber based impregnating composition to load the glass fiber bundles with a total of more than 10% by weight dry solids of the elastomeric based materials.

2. The process as claimed in claim 1 in which the elastomeric based coating composition and the elastomeric based impregnating composition are substantially the same.

3. The process as claimed in claim 1 in which the amount of coating applied to the individual glass fibers is more than 4% by weight on the dry solids basis.

4. The process as claimed in claim 1 in which the amount of coating applied to the glass fibers is within the range of 7-8% by weight on the dry solids basis.

5. The process as claimed in claim 1 in which the elastomeric coating is applied to the glass fibers in forming to coat the individual glass fibers.

6. The process as claimed in claim 1 in which the total elastomeric based material in the impregnated bundles of glass fibers is within the range of 10-24% by weight of the impregnated glass fiber system.

7. The process as claimed in claim 1 in which the total elastomeric based material in the impregnated bundles of glass fibers is within the range of 13-20% by weight of the impregnated glass fiber system.

8. The process as claimed in claim 1 in which the total elastomeric based material in the impregnated bundles of glass fibers is within the range of 16-18% by weight of the impregnated glass fiber system.

9. The process as claimed in claim 1 which includes the steps of combining the impregnated bundle of glass fibers with the continuous phase elastomer and molding the glass fiber-elastomeric product therefrom.

10. The process as claimed in claim 1 in which the bundle of coated glass fibers, prior to impregnation, contains an amount of elastomeric material insufficient completely to fill the interstices between the fibers whereby, during subsequent impregnation with the rubber based material, the impregnating composition penetrates into the interior of the glass fiber bundle for integration of the treating material with the bundle.

11. The process as claimed in claim 1 in which the glass fiber bundle has rubber based material distributed substantially throughout the bundle of glass fibers with the higher concentration of elastomeric based material at the outer portions of the glass fiber bundle by comparison with the interior.

12. The process as claimed in claim 11 in which the bundle is substantially enclosed within a layer of the elastomeric based material.

13. In the preparation of an element of glass fibers for use in the reinforcement of elastomeric materials forming the continuous phase in the manufacture of glass fiber-elastomeric products, the method for improving the integration of the glass fiber component with the elastomeric material comprising the steps of providing a glass melt, issuing a plurality of streams of molten glass from the melt, rapidly attenuating the streams of molten glass into fine flexible glass fibers, coating the individual glass fibers in forming with an elastomeric based composition in an amount to provide up to 10% but more than 4% loading calculated on a dry solids basis, gathering the coated glass fibers into a glass fiber bundle, processing bundles of such coated glass fibers to the form desired for combination with the continuous phase elastomer, and impregnating the processed bundles of glass fibers with a rubber based impregnating composition to provide a total loading of coating and impregnating composition of more than 10% but less than 24% by weight calculated on the dry solids basis.

14. The method as claimed in claim 13 in which the amount of coating applied to the glass fibers is within the range of 5-9% by weight solids.

15. The method as claimed in claim 13 in which the total loading of coating and impregnating composition is within the range of 13% to 20% by weight on the solids basis.

16. In the method of producing glass fiber reinforced elastomeric products comprising combining the elastomeric material forming the continuous phase in the elastomeric product in an uncured or unvulcanized state with glass fibers in bundle form loaded with more than 10% by weight but less than 24% by weight of elastomeric based material, molding the combination of glass fiber bundles and continuous phase elastomer and advancing the elastomeric material to a set stage.

17. The method as claimed in claim 16 in which the glass fiber bundles are loaded with the elastomeric based material in an amount within the range of 13% to 20% by weight.

18. The method as claimed in claim 16 in which the molded elastomeric material and glass fiber product are advanced to a cured stage.

19. The method as claimed in claim 16 in which the molded elastomeric material and glass fiber product are advanced to a vulcanized stage.

20. A bundle formed of a multiplicity of glass fibers, an elastomeric based material distributed throughout the cross section of the glass fiber bundle with the concentration of elastomeric based material being higher in the outer portions of the glass fiber bundle than in the central interior portion of the glass fiber bundle, with the total amount of elastomeric based material being within the range of 10% to 24% by weight.

21. A glass fiber bundle as claimed in claim 20 in which the individual glass fibers throughout the glass fiber bundle are separated one from another by the elastomeric based composition to cushion the fibers one from another while permitting relative movement between the fibers.

22. A glass fiber reinforcement for elastomeric materials comprising a bundle formed of a multiplicity of glass fibers in which the individual glass fibers of the bundle have a coating of elastomeric based material and in which the bundle of glass fibers is fully loaded with elastomeric based material in an amount sufficient to interbond the bundle with the continuous phase elastomer to be reinforced while protecting the individual glass fibers in the bundle to prevent the fibers from breaking through during flexure and wherein the individual glass fibers in the bundle are capable of relative movement sufficient to contribute their proportionate share of reinforcement in the bundle, the total amount of the elastomeric based material being within the range of 10% to 24% by weight.

References Cited
UNITED STATES PATENTS 3,424,608   1/1969   Marzocchi et al. ___ 117—126X WILLIAM D. MARTIN, Primary Examiner D. COHEN, Assistant Examiner U.S. Cl. X.R.

117—72, 76, 126